(12) United States Patent
Bikumala et al.

(10) Patent No.: US 10,933,504 B2
(45) Date of Patent: Mar. 2, 2021

(54) HARD DISK DRIVE SCRAPPER

(71) Applicant: Dell Products L. P., Round Rock, TX (US)

(72) Inventors: Sathish Kumar Bikumala, Round Rock, TX (US); Jose Alejandro Boillat, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 499 days.

(21) Appl. No.: 15/966,177

(22) Filed: Apr. 30, 2018

(65) Prior Publication Data
US 2019/0329373 A1    Oct. 31, 2019

(51) Int. Cl.
| | | |
|---|---|---|
| G11B 33/00 | (2006.01) | |
| G11B 5/82 | (2006.01) | |
| B24B 19/03 | (2006.01) | |
| G11B 23/28 | (2006.01) | |
| G11B 25/04 | (2006.01) | |
| G11B 20/00 | (2006.01) | |
| G11B 33/12 | (2006.01) | |
| G11B 5/024 | (2006.01) | |

(52) U.S. Cl.
CPC ............... B24B 19/03 (2013.01); G11B 5/82 (2013.01); G11B 20/00586 (2013.01); G11B 23/281 (2013.01); G11B 25/043 (2013.01); G11B 33/00 (2013.01); G11B 33/121 (2013.01); *G11B 5/0245* (2013.01)

(58) Field of Classification Search
None
See application file for complete search history.

(56) References Cited

U.S. PATENT DOCUMENTS

| | | | | |
|---|---|---|---|---|
| 5,406,261 | A | * | 4/1995 | Glenn ................... G06F 21/74 340/571 |
| 6,061,805 | A | * | 5/2000 | Suzuki ................ G11B 19/041 714/2 |
| 8,369,768 | B2 | * | 2/2013 | Thayer ............... G03G 21/0029 399/350 |
| 9,947,343 | B1 | * | 4/2018 | Crook ..................... B26D 1/08 |
| 2002/0191523 | A1 | * | 12/2002 | Warmenhoven ..... G11B 23/505 369/72 |
| 2006/0072244 | A1 | * | 4/2006 | Rapp .................... G11B 23/505 360/137 |
| 2011/0075301 | A1 | * | 3/2011 | Tsuchiya .............. G11B 5/4826 360/245.3 |

(Continued)

*Primary Examiner* — Jefferson A Evans
(74) *Attorney, Agent, or Firm* — Campbell Stephenson LLP

(57) ABSTRACT

Disclosed herein is an apparatus and/or device to scrape a hard disk drive (HDD) to completely and permanently erase, remove, and/or destroy digital and/or electronic data and/or information stored on and/or written to the HDD without using and/or necessitating the use of external induction. The apparatus includes a first part of a HDD scrapper mounted on an arm of the HDD and a second part of the HDD scrapper mounted on a scrapper head. The apparatus also includes a turner that simultaneously permits a turning operation of magnetic platters of the HDD and the HDD scrapper. The first part, the second part, the arm, the scrapper head, the turner, and the magnetic platters are included in an enclosure of the HDD.

15 Claims, 3 Drawing Sheets

(56) References Cited

U.S. PATENT DOCUMENTS

| | | | |
|---|---|---|---|
| 2011/0149429 A1* | 6/2011 | Koike | G11B 19/048 |
| | | | 360/75 |
| 2012/0120521 A1* | 5/2012 | Kurita | G11B 5/6076 |
| | | | 360/75 |
| 2012/0151599 A1* | 6/2012 | Chatfield | G11B 20/00659 |
| | | | 726/26 |
| 2019/0099971 A1* | 4/2019 | Gutierrez | B02C 19/00 |
| 2020/0270725 A1* | 8/2020 | McIntyre | H01F 7/02 |

* cited by examiner

HARD DISK DRIVE SCRAPPER

FIELD OF THE DISCLOSURE

This disclosure is related to erasing data. In particular, this disclosure is related to a hard disk drive (HDD) scrapper.

DESCRIPTION OF THE RELATED ART

A hard disk drive (HDD) is a data storage device that uses magnetic storage to store and retrieve digital information using one or more rigid rapidly rotating disks called platters that are coated with magnetic material. The platters are paired with magnetic heads, usually arranged on a moving actuator arm, which read and write data to the platter surfaces. HDDs are a type of non-volatile storage, retaining stored data even when powered off.

HDDs are ubiquitous in home and business computing environments. A typical HDD can contain personal and sensitive information (e.g., bank account numbers, photos, usernames, passwords, and the like). This sensitive information can continue to exist even after data on the HDD is deleted and the HDD reformatted. Permanently erasing data stored on and/or written to a HDD requires the destruction of the magnetic platter(s) of the HDD.

In some cases, data stored on a HDD can be erased using certain software programs. However, as noted above, erasing HDD data using such software programs may not completely remove and/or erase the data from the HDD. The only foolproof method of completely and permanently erasing, removing, and/or destroying digital/electronic data stored on a HDD is to (physically) destroy the magnetic platter(s) of the HDD. Unfortunately, currently-existing mechanisms that destroy the magnetic platter(s) of the HDD are cumbersome and expensive. What's more, these currently-existing methodologies require external induction and cannot be performed within an enclosure of the HDD. Requiring external induction to (physically) destroy HDD platters is undesirable from a logistical and financial standpoint.

SUMMARY OF THE DISCLOSURE

Disclosed herein is an apparatus, a device, and/or a mechanism to scrape a hard disk drive (HDD) to completely and permanently erase, remove, and/or destroy digital and/or electronic data and/or information stored on and/or written to the HDD.

In one embodiment, the apparatus includes a first part of a HDD scrapper mounted on an arm of the HDD and a second part of the HDD scrapper mounted on a scrapper head. The apparatus also includes a turner that simultaneously permits a turning operation of one or more platters of the HDD and the HDD scrapper. In this example, the first part of the HDD scrapper, the second part of the HDD scrapper, the arm of the HDD, the scrapper head, and the platter(s) of the HDD are included in an enclosure of the HDD.

In certain embodiments, the first part of the HDD scrapper includes a first joiner and a first socket, and the second part of the HDD scrapper includes a second joiner and a second socket. In this example, the first part of the HDD scrapper and the second part of the HDD scrapper are coupled to an exterior latch that permits the HDD scrapper to be released for performing the turning operation, and the first part of the HDD scrapper and the second part of the HDD scrapper are coupled to each other via a silicon ring.

In some embodiments, the turning operation is performed using a hex key, and the scrapper head includes an abrasive. In these examples, the turning operation causes scrapping of one or more platters of the HDD by the scrapper head, and the scrapping of the one or more platters of the HDD by the scrapper head causes destruction of data stored on the HDD.

In other embodiments, a hard disk drive (HDD) scrapper includes a first portion mounted on an actuator arm of a HDD, a second portion mounted on a scrapper head, and an independent fulcrum that permits coupling of the first portion and the second portion for operation of the scrapper head to scrape one or more platters of the HDD. The first portion and the second portion are included in an enclosure of the HDD, and the coupling of the first portion and the second portion permits a turning operation of the scrapper head to scrape the one or more platters of the HDD.

In one embodiment, the first portion includes a first joiner and a first socket, and the second portion comprises a second joiner and a second socket. In this example, the first portion and the second portion are coupled to an exterior latch, the first portion and the second portion are coupled to each other via a silicon ring, and the exterior latch permits the scrapper head to scrape the one or more platters of the HDD as part of the turning operation. The scrapper head includes an abrasive, and the scrapping of the one or more platters of the HDD by the scrapper head causes destruction of data stored on the HDD.

In another embodiment, a hard disk drive (HDD) scrapping device for scrapping one or more platters of a HDD include a scrapping mechanism, where a first portion of the scrapping mechanism is mounted on an actuator arm of the HDD, and a scrapper head, where a second portion of the scrapping mechanism is mounted on the scrapper head.

In certain embodiments, the scrapping mechanism includes an independent fulcrum that permits coupling of the first portion and the second portion via a silicon ring, the first portion and the second portion are included in an enclosure of the HDD (which functions as a validation mechanism for the HDD scrapper), the first portion includes a first joiner and a first socket, and the second portion comprises a second joiner and a second socket. In this example, the scrapper head includes an abrasive (e.g., a material that causes a workpiece like HDD platters to be worn away by friction through rubbing or scrapping).

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
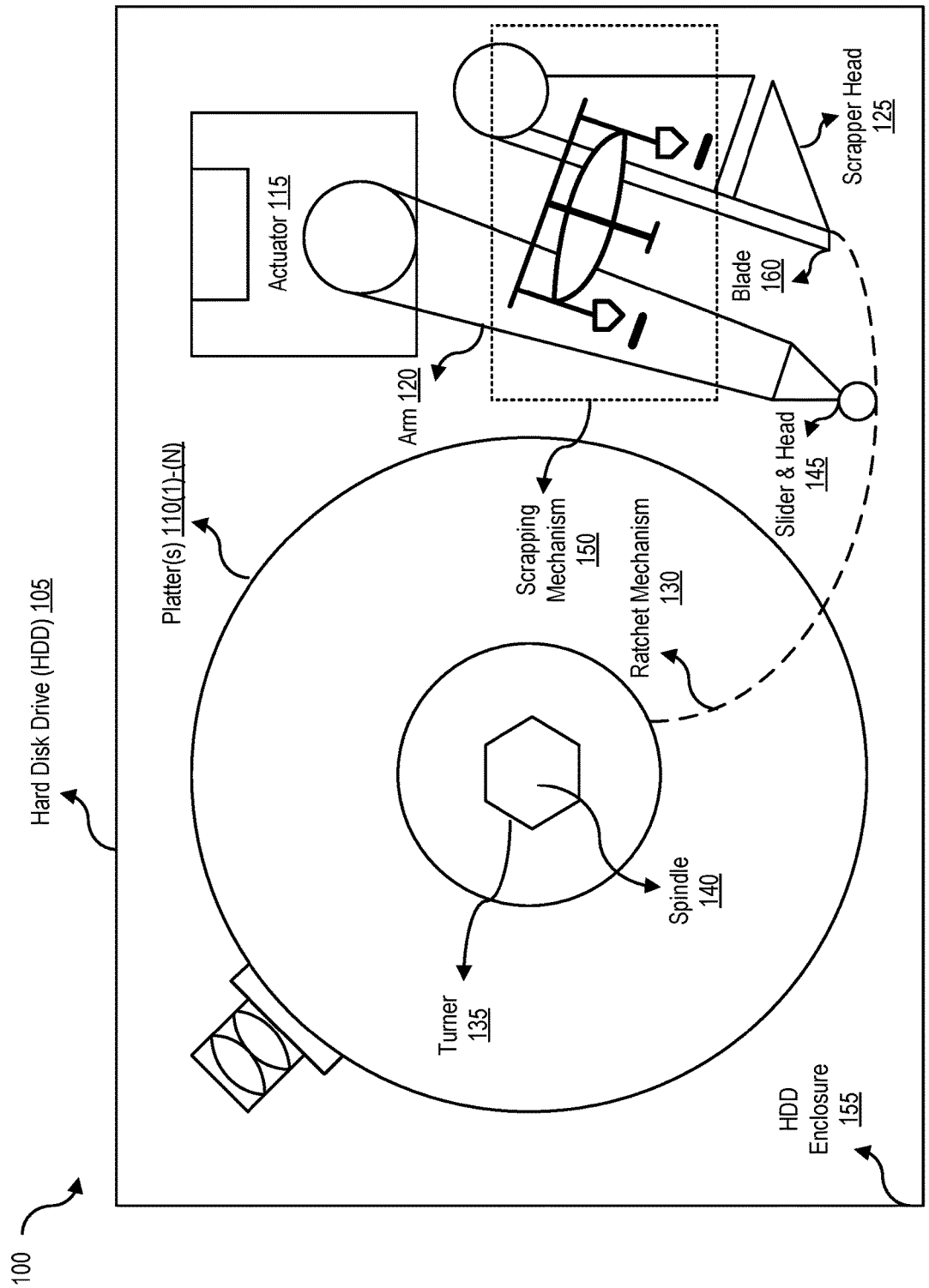
FIG. 1 is a diagram 100 of a hard disk drive (HDD) scrapper implemented in a HDD enclosure, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A hard disk drive (HDD) is a data storage device that uses magnetic storage to store and retrieve digital information using one or more rigid rapidly rotating disks called platters that are coated with magnetic material. The platters are paired with magnetic heads, usually arranged on a moving actuator arm, which read and write data to the platter surfaces. HDDs are a type of non-volatile storage, retaining stored data even when powered off.

HDDs are ubiquitous in home and business computing environments. A typical HDD can contain personal and sensitive information (e.g., bank account numbers, photos, usernames, passwords, and the like). This sensitive information can continue to exist even after data on the HDD is deleted and the HDD reformatted. Permanently erasing data stored on and/or written to a HDD requires the destruction of the magnetic platter(s) of the HDD.

As previously noted, data stored on a HDD can be erased using certain software programs. However, as noted above, erasing HDD data using such software programs may not completely remove and/or erase the data from the HDD. The only foolproof method of completely and permanently erasing, removing, and/or destroying digital/electronic data stored on a HDD is to (physically) destroy the magnetic platter(s) of the HDD. Unfortunately, currently-existing mechanisms that destroy the magnetic platter(s) of the HDD are cumbersome and expensive. What's more, these currently-existing methodologies require external induction and cannot be performed within an enclosure of the HDD. Requiring external induction to (physically) destroy HDD platters is undesirable from a logistical and financial standpoint.

For example, in a typical scenario, a foolproof method of destroying data stored on a HDD is to destroy the HDD's magnetic platter(s) by physically unscrewing the HDD's case, opening the HDD enclosure, and physically destroying the magnetic platter(s) with a hammer (while employing safety eyewear). This method is cumbersome and requires tools like a screwdriver, a hammer, and eyewear, while exposing the performer to the risk of injury (e.g., as the result of small airborne parts of the magnetic platter(s)).

Further, useful parts of the HDD cannot be repurposed due to physical destruction caused to the HDD and associated parts by the hammer. Therefore, existing methods of HDD data erasure and destruction are externally induced via pressure, magnets, heat, and the like. For example, these archaic methods involve external induction of heat, application of physical pressure and/or force, using magnetic force, and/or dipping the HDD in dangerous chemicals and/or acid(s). Commercially available solutions for physical HDD destruction also require external induction and are prohibitively expensive for individual use.

Disclosed here in an apparatus, a device, and/or a mechanism to scrape a HDD to completely and permanently erase, remove, and/or destroy digital and/or electronic data and/or information stored on and/or written to the HDD without using and/or necessitating the use of external induction (e.g., of pressure, force, chemicals, and the like).

Example Hard Disk Drive Scrapper

FIG. 1 is a diagram 100 of a hard disk drive (HDD) scrapper implemented in a HDD enclosure, according to one embodiment. As shown in FIG. 1, HDD 105 includes at least platters 110(1)-(N) (also referred to herein as magnetic platters), an actuator 115, an arm 120 (also referred to herein as an actuator arm), a scrapper head 125, a ratchet mechanism 130 (e.g., a zip tie), a turner 135, a spindle 140, and a slider and head 145. Scrapper head 125 includes a blade 160. The foregoing components of HDD 105 are contained and/or included in a HDD enclosure 155. HDD 105 also includes a scrapping mechanism 150 (also referred to herein as HDD scrapper and/or HDD scrapping device).

In one embodiment, scrapping mechanism 150 includes a first part of a HDD scrapper mounted on arm 120 and a second part of the HDD scrapper mounted on scrapper head 125 (e.g., as shown within the dotted lines of scrapping mechanism 150 in FIG. 1). Turner 135 permits a turning operation of one or more of platters 110(1)-(N) of HDD 105 and the HDD scrapper (e.g., scrapping mechanism 150). In this example, the first part of the HDD scrapper and the second part of the HDD scrapper, arm 120, scrapper head 125, and platters 110(1)-(N) are included in enclosure 155 of HDD 105.

Figure 2:
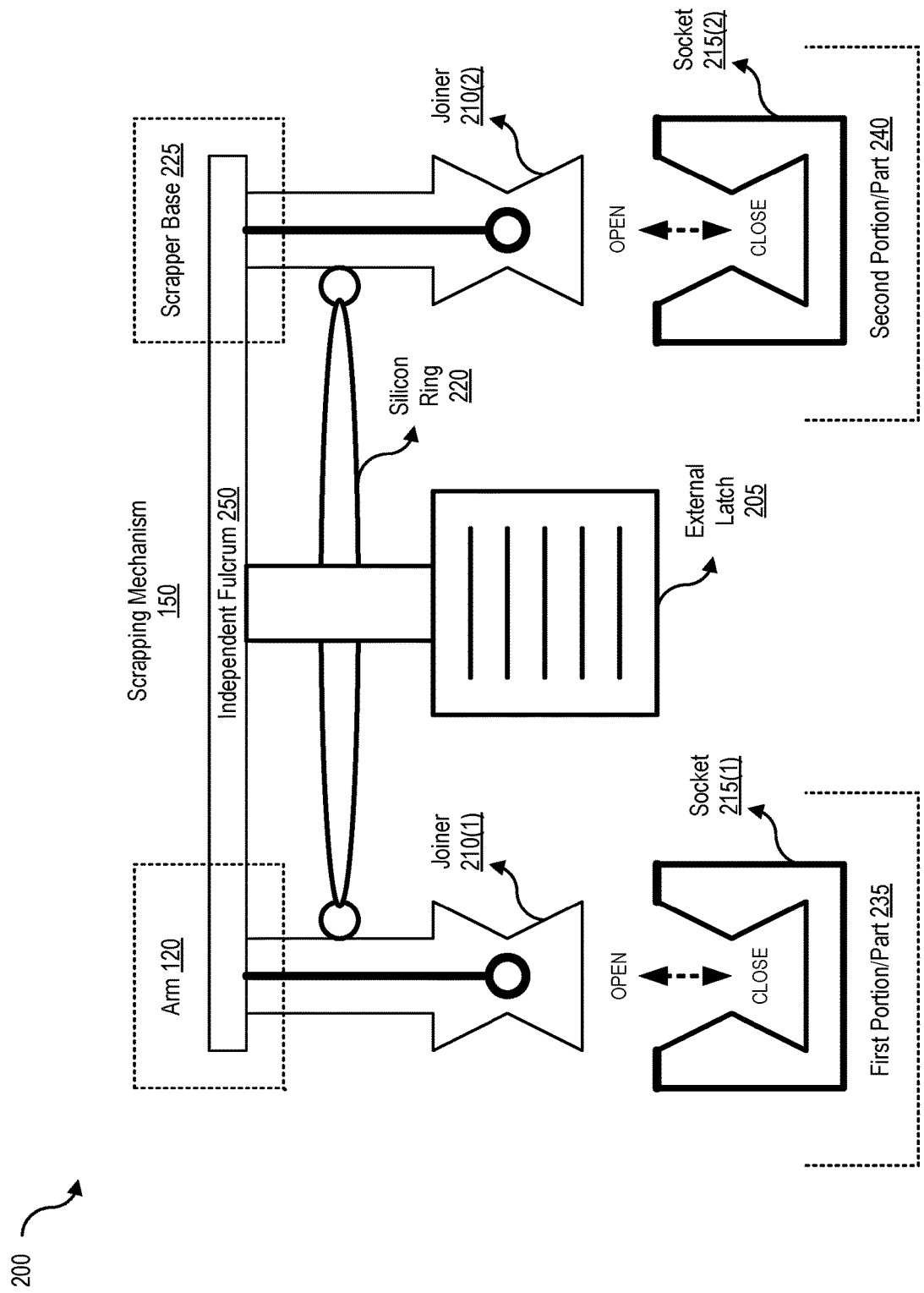
FIG. 2 is a diagram 200 of a HDD scrapping mechanism, according to one embodiment of the present disclosure.

FIG. 2 is a diagram 200 of a HDD scrapping mechanism, according to one embodiment. As shown in FIG. 2, first part 235 of the HDD scrapper includes a first joiner (e.g., joiner 210(1)) and a first socket (e.g., socket 215(1)), and second part 240 of the HDD scrapper includes a second joiner (e.g., joiner 210(2)) and a second socket (e.g., socket 215(2)). These joiner-socket combinations permit independent fulcrum 150 to open and close scrapping mechanism 150 for (physically) scrapping platters 110(1)-(N) of HDD 105 (e.g., using blade 160). In one embodiment, the foregoing scrapping action and/or scrapping operation by scrapper head 125 and blade 160 is performed in conjunction with the clockwise manual movement of turner 135 (e.g., by turning turner 135 using a hex key or other comparable turning device). Therefore, in this example, the scrapping action and/or scrapping operation is a mechanically induced action that destroys data stored on platters 105(1)-(N) of HDD 105 using scrapping mechanism 155 that is contained within HDD enclosure 155.

In certain embodiments, first part 235 of the HDD scrapper (attached to arm 120 as shown in FIGS. 1 and 2) and second part 240 of the HDD scrapper (attached to scrapper base 225 as shown in FIGS. 1 and 2) are coupled to external latch 205 that permits the HDD scrapper to be released for performing the turning operation. First part 235 of the HDD scrapper and second part 240 of the HDD scrapper are coupled to each other via silicon ring 220. In the foregoing examples, the HDD scrapper includes at least scrapping mechanism 150 (shown in FIG. 2), and scrapper head 125, blade 160, and turner 135 (shown in FIG. 1). In other examples, the HDD scrapper can include one or more components that perform substantially the same and/or similar function as scrapping mechanism 150, scrapper head 125, blade 160, and/or turner 135.

In one embodiment, external latch 205 is on the outside of a lid of HDD enclosure 155 and includes hollow inserts made of rubber on the inside (e.g., the circular inserts holding silicon ring 220 as shown in FIG. 2). The inserts and silicon ring 220 provide flexibility needed for at least two arms on independent fulcrum 250 (e.g., first portion/part 235 and second portion/part 240). When external latch 205 is released, the first portion/part 235 and second portion/part 240 operate independently of independent fulcrum 250 (e.g., as shown in FIG. 3, infra) to scrape one or more of platters 110(1)-(N) of HDD 105 using scrapper head 125 (and blade 160) with the clockwise manual movement of turner 135 (e.g., using a hex key).

Therefore, the turning operation of turner 135 that causes the scrapping of one or more of platters 110(1)-(N) by scrapper head 125 can be performed using a hex key (also referred to as an Allen key or Allen wrench), or any other comparable tool for turning turner 135 that causes the movement of platters 110(1)-(N) around spindle 140. The scrapping of one or more of platters 110(1)-(N) by scrapper head 125 and blade 160 causes destruction of data stored on HDD 105. In this example, scrapper head 125 includes an abrasive. However, scrapper head 125 and/or blade 160 can include any other material that provides for the scrapping of one or more of platters 110(1)-(N) (e.g., quartz metal), while withstanding the long-term and repeated performance of the scrapping action and/or scrapping operation.

Figure 3:
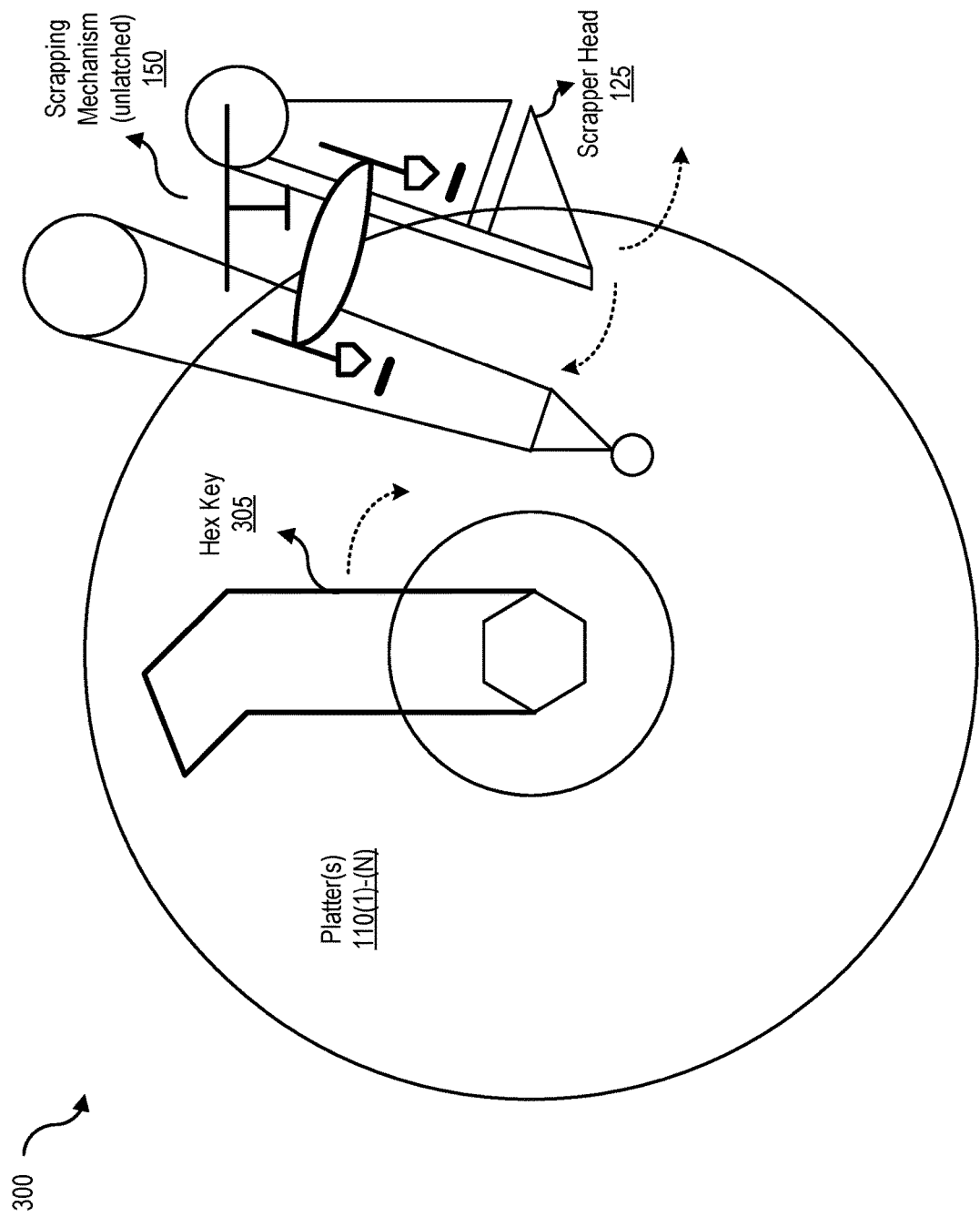
FIG. 3 is a diagram 300 of a HDD scrapping apparatus and/or device, according to one embodiment of the present disclosure.

FIG. 3 is a diagram 300 of a HDD scrapping apparatus and/or device, according to one embodiment. When unlatched (e.g., when exterior latch 205 is pulled), first part/portion 235 and second part/portion 240 of scrapping mechanism 150 are separated from independent fulcrum 250. However, although first part/portion 235 is on arm 120 and second part/portion 240 is on scrapper base 225, second part/portion 240 can operate scrapper head 125 because first part/portion 235 and second part/portion 240 are coupled to each other via silicon ring 220 (or a ring composed of a material that provides substantially the same or similar functionality as silicon ring 220). Therefore, the manual turning of turner 135 with hex key 305 causes a back and forth movement of scrapper head 125 onto the surfaces of platters 110(1)-(N) (e.g., in conjunction with the movement of arm 120, which, as the result of being coupled to scrapper head 125 because of first part/portion 235 and second part/portion 240, is held stationary on platters 110(1)-(N), permitting the back and forth movement of scrapper head 125).

Therefore, a HDD scrapping device as shown in FIGS. 1, 2, and 3 permits scrapping of one or more platters 110(1)-(N) of HDD 105 by including scrapping mechanism 150, first portion 235 of which is mounted on an actuator arm of HDD 105 (e.g., arm 120), and scrapper head 125, where second portion 240 of scrapping mechanism 150 that is mounted on scrapper head 125 (or on scrapper base 225). Independent fulcrum 250 permits coupling (e.g., latching) and decoupling (e.g., unlatching) of first portion 235 and second portion 240 via silicon ring 220, permitting scrapper head 125 to scrape platters 110(1)-(N) of HDD 105 when a turning mechanism (e.g., a hex key) is used to manually turn turner 135.

Therefore, the apparatus, device, and/or mechanism described herein scrapes a HDD to completely and permanently erase, remove, and/or destroy digital and/or electronic data and/or information stored on and/or written to the HDD without using and/or necessitating the use of external induction (e.g., of pressure, force, chemicals, and the like).

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. An apparatus comprising:
a first part of a hard disk drive (HDD) scrapper mounted on an arm of a HDD;
a second part of the HDD scrapper mounted on a scrapper head; and
a turner that simultaneously permits a turning operation of one or more platters of the HDD and the HDD scrapper,
wherein the first part of HDD scrapper, the second part of the HDD scrapper, the arm of the HDD, the scrapper head, and the one or more platters of the HDD are comprised in an enclosure of the HDD;
wherein the first part of the HDD scrapper comprises a first joiner and a first socket.

2. The apparatus of claim 1, wherein
the second part of the HDD scrapper comprises a second joiner and a second socket.

3. The apparatus of claim 2, wherein
the first part of the HDD scrapper and the second part of the HDD scrapper are coupled to an exterior latch.

4. The apparatus of claim 3, wherein
the first part of the HDD scrapper and the second part of the HDD scrapper are coupled to each other via a silicon ring.

5. The apparatus of claim 4, wherein
the exterior latch permits the HDD scrapper to be released for performing the turning operation.

6. The apparatus of claim 5, wherein
the turning operation is performed using a hex key, and
the scrapper head comprises an abrasive.

7. The apparatus of claim 6, wherein
the turning operation causes scrapping of the one or more platters of the HDD by the scrapper head.

8. The apparatus of claim 7, wherein
the scrapping of the one or more platters of the HDD by the scrapper head causes destruction of data stored on the HDD.

9. A hard disk drive (HDD) scrapper, comprising:
a first portion mounted on an actuator arm of a HDD;
a second portion mounted on a scrapper head; and
an independent fulcrum that permits coupling of the first portion and the second portion for operation of the scrapper head to scrape one or more platters of the HDD;
wherein the first portion and the second portion are comprised in an enclosure of the HDD, and the coupling of the first portion and the second portion permits a turning operation of the scrapper head to scrape the one or more platters of the HDD;
wherein the first portion comprises a first joiner and a first socket, and the second portion comprises a second joiner and a second socket.

10. The HDD scrapper of claim 9, wherein
the first portion and the second portion are coupled to an exterior latch,
the first portion and the second portion are coupled to each other via a silicon ring, and
the exterior latch permits the scrapper head to scrape the one or more platters of the HDD as part of the turning operation.

11. The HDD scrapper of claim 10, wherein
the scrapper head comprises an abrasive, and
the scrapping of the one or more platters of the HDD by the scrapper head causes destruction of data stored on the HDD.

12. A hard disk drive (HDD) scrapping device for scrapping one or more platters of a HDD, the HDD scrapping device comprising:
- a scrapping mechanism, wherein a first portion of the scrapping mechanism is mounted on an actuator arm of the HDD; and
- a scrapper head, wherein a second portion of the scrapping mechanism is mounted on the scrapper head;
- wherein the scrapping mechanism comprises an independent fulcrum that permits coupling of the first portion and the second portion via a silicon ring.

13. The HDD scrapping device of claim 12, wherein of the first portion and the second portion are comprised in an enclosure of the HDD.

14. The HDD scrapping device of claim 13, wherein the first portion comprises a first joiner and a first socket, and
the second portion comprises a second joiner and a second socket.

15. The HDD scrapping device of claim 14, wherein the scrapper head comprises an abrasive.

* * * * *